July 23, 1963    E. R. DUDLEY    3,098,551
CAN FEEDING AND DIVIDING APPARATUS AND SYSTEM
Filed Dec. 14, 1959    2 Sheets-Sheet 1
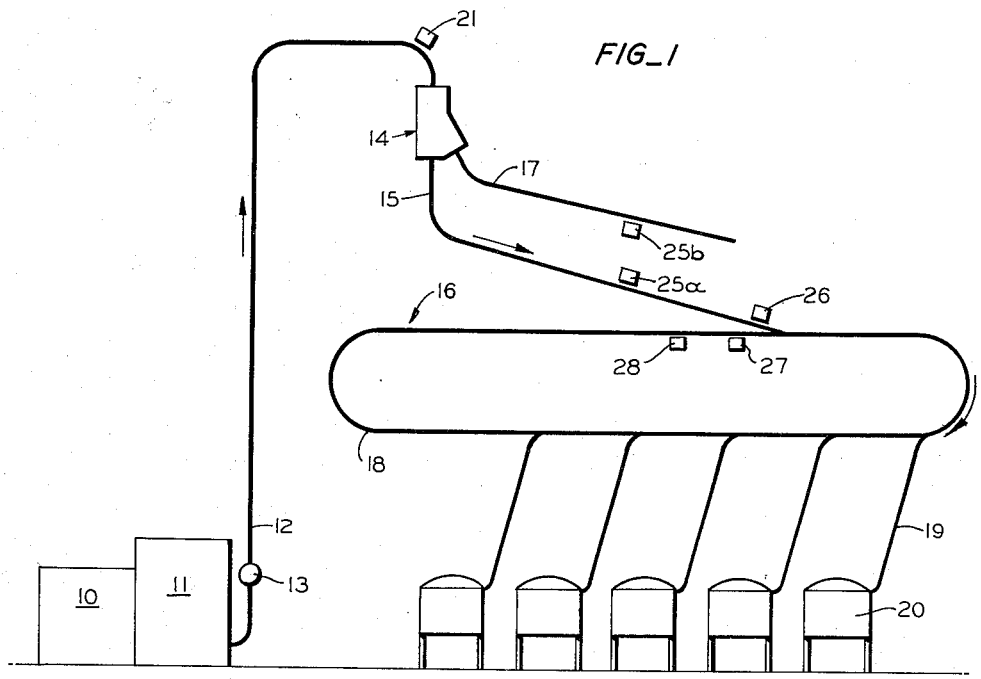
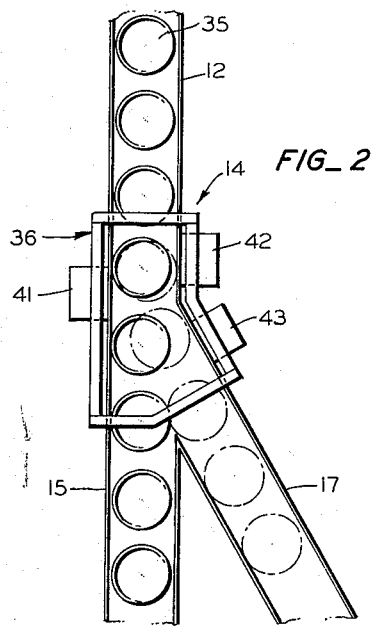
INVENTOR.
EDMOND R. DUDLEY
BY
ATTORNEY

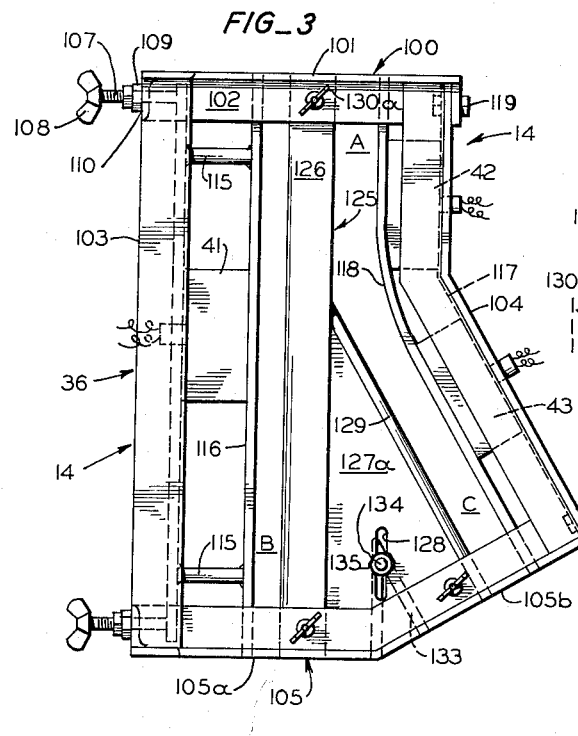

United States Patent Office 3,098,551
Patented July 23, 1963

3,098,551
CAN FEEDING AND DIVIDING APPARATUS AND SYSTEM
Edmond R. Dudley, Santa Clara, Calif., assignor to Peerless Equipment Company, Mountain View, Calif., a corporation of California
Filed Dec. 14, 1959, Ser. No. 859,294
4 Claims. (Cl. 193—31)

This invention relates to can supply means for supplying cans as required in a cannery, in a can manufacturing plant or the like. More particularly the invention relates to an electromechanical means for dividing the supply of cans in a cannery, can manufacturing plant or the like between two or more paths according to demands on each path. The invention also relates to a system for maintaining an adequate but not excessive supply of cans at all times according to demands from several machines.

The invention also has application to the feeding and proportioning of objects other than cans but its principal application is in connection with metal cans, which will be referred to hereinafter.

This application is a continuation-in-part of my copending application Serial No. 686,915, filed September 30, 1957, for "Flow Control Device" now Patent No. 3,032,709, issued May 1, 1962, and of my application Serial No. 781,742, filed December 19, 1958, now Patent No. 3,018,437, for "Motion and Void Control Device," issued Jan. 1, 1962.

In a typical environment wherein the present invention has utility, empty cans, each having one end closed and the other end open, are supplied continuously and at high speed from storage to a series of fillers which fill the empty cans with product. The fillers may operate at varying speeds, and/or some of them may shut down from time to time while others continue operating. Therefore, the demand of the fillers varies from time to time. That is to say, the number of cans that must be supplied to the fillers fluctuates. It is desirable to supply cans at all times in sufficient quantity to each filler while avoiding an over supply and resultant jamming.

It is an object of the present invention to provide an improved control device for controlling the supply of articles such as metal cans to two or more machines, processes or pieces of equipment in accordance with varying demand.

It is a further object of the invention to provide a dividing apparatus having an input element capable of receiving a moving line of metal cans or the like, two or more output elements capable of directing the cans to as many different paths and means for automatically and selectively activating any one of the output elements while the other or others remain inactivated, all in accordance with demand upon the several paths.

The above and other objects of the invention will be apparent from the ensuing description and the appended claims.

One form of the invention is shown by way of example in the accompanying drawings, in which:

FIGURE 1 is a diagrammatic flow sheet showing a system for supplying cans to fillers and employing the can divider of the present invention.

FIGURE 2 is a diagrammatic view of the electromechanical can divider of the present invention.

FIGURE 3 is a view in side elevation of the can divider.

FIGURE 4 is a top plan view of the can divider as seen from above FIGURE 3.

FIGURE 5 is a diagrammatic drawing showing the control circuit for the magnets of the can divider.

Referring now to the drawings and preliminarily to FIGURE 1, a supply of cans on pallets is shown at 10 which are removed from the pallets and are supplied one at a time by a depalletizing apparatus 11 to a can conveyor 12. The depalletizer may be of any suitable type. Cans may be supplied to the can conveyor 12 by any other means, for example, by a can unscrambler. A motive means 13 is shown which elevates the cans in the vertical portion of the can conveyor 12.

The conveyor 12 (and others herein described) may be of any suitable type such as a cage acting to confine and guide the cans together with suitable moving cables where necessary. Several types of conveyor are known and the particular features thereof are not a part of the present invention, hence require no detailed description.

Cans are supplied by the conveyor 12 (which will be referred to as the master conveyor) to a can divider 14. The can divider 14 is illustrated in FIGURES 3 and 4 and is described hereinafter. It is preferably magnetically operated to divert cans selectively either to a branch conveyor 15, thence to a circulating system 16, or to another branch conveyor 17, thence to a similar circulating system (not shown) or to some other piece of equipment.

The can circulating system 16 comprises a closed can conveyor 18 which is capable, when called upon in the manner described hereinafter, to circulate cans continuously through 360°. For this purpose it is preferred, in most cases, to employ a cable which continuously moves about its closed path, but other suitable motive means may be employed.

Cans moving on the conveyor 18 are free to drop out into branch conveyors or can guides 19 which lead to fillers 20, five of which are shown. Of course, a smaller or larger number may be employed.

For convenience a number of can stops and sensing heads incorporated in this system will be referred to briefly at this point. These elements comprise a master can stop at 21 which is adjacent the conveyor 12 and upstream in relation to the can divider 14; a sensing head 25a adjacent the conveyor 15 and which is downstream in relation to the can divider 14 but upstream in relation to the junction of the conveyors 15 and 18; a second, similar sensing head 25b adjacent the branch conveyor 17 and downstream in relation to the can divider 14; a can stop 26 which is adjacent the conveyor 15 and downstream in relation to the sensing head 25a but upstream in relation to the junction of the conveyors 15 and 18; a can stop 27 which is adjacent the conveyor 18 and upstream or to the left in relation to the junction of the conveyors 15 and 18; and a sensing head 28 adjacent the conveyor 18 and upstream or to the left in relation to the can stop 27.

During operation of the system 16, as long as an adequate and not excessive supply of cans are being supplied to meet the demands of the fillers 20, the master can stop 21 is de-energized and allows cans to pass to the can divider 14; the divider 14 is set so that it directs cans to the conveyor 15 rather than to the conveyor 17; the can stop 26 is de-energized and allows cans to enter the circular conveyor 18; and the cans drop out into the branch conveyors or can guides 19 and pass to the respective fillers 20. Meanwhile the can stop 27 is energized and in a position to stop the passage of can from left to right as viewed in FIGURE 1. However, because only enough cans are being supplied to the conveyor 18 to fill the needs of the fillers 20, no cans pass by the last drop-out 19 and, therefore, the can stop 27, although it is in readiness, is not called upon to function.

Assume now that the supply of cans by the motive means 13 exceeds the demand of the fillers 20. It follows that the excess cans will travel past the drop-out 19 of the last filler 20 and will continue about the bend in the circular can conveyor 18 and will therefore come into contact with the can stop 27. As excess cans back up beyond the can stop 27 they will also soon back up past the sensing head 28.

The sensing head 28 may be of any suitable type. Preferably it is of the type described and claimed in my Patent No. 3,032,709 and may be employed with any suitable type of circuit, preferably that of the aforesaid patent. As described in said patent, the sensing head and its circuit sense the presence of stationary cans adjacent the sensing head. That is to say, the sensing head 28 will sense a condition such as that just described, wherein cans are backed up and are at rest adjacent the sensing head. Preferably, as described in the aforesaid patent the circuit embodies a delay element which causes the circuit to respond to the aforesaid condition after a predetermined delay. In the present case the sensing head 28 and its circuit act through suitable relays (not shown) each having a time delay element associated therewith. The first such relay to act functions to activate the can stop 26. Therefore no more cans pass from conveyor 15 to the circular conveyor 18 except those which are downstream from can stop 26. The second relay then acts, after a time delay sufficient to allow all cans in conveyor 15 downstream from the can stop 26 to enter the circular conveyor 18 and clear the junction of conveyors 15 and 18, thereby avoiding a jam. When this second relay acts, the can stop 28 is de-activated and it allows cans to circulate in the conveyor 18. The circulating cans will drop out as demanded into the branch conveyors 19 to the fillers 20.

Since the can stop 26 is now activated cans will back up in the conveyor 15 past the sensing head 25a. The latter and its circuit resemble the sensing head 28 and its circuit. They sense the presence of stationary cans and cause a switching of can divider 14 to divert cans from branch conveyor 15 to branch conveyor 17.

Referring now to FIGURE 2 the can divider 14 is there shown diagrammatically and so much of the input conveyor 12 and of the output conveyors 15 and 17 as necessary to understand the relation of the can divider to the over-all system. Cans are shown at 35. The can divider 14 has a frame 36 with a single entry section at the top and two outlet sections at the bottom. An electromagnet 41 is mounted alongside and to the left (as viewed in FIGURE 2) of the can divider. A pair of magnets 42 and 43 are mounted along the opposite side of the can divider.

It will be apparent that, if the magnet 41 is energized and the magnets 42 and 43 are de-energized, the cans 35 will drop vertically through to the conveyor 15 but if the magnet 41 is de-energized and the magnets 42 and 43 are energized, the cans 35 will be diverted to the conveyor 17.

Referring now to FIGURE 5, a diagram of the circuit for the magnets 41, 42 and 43 of the can divider 14 and for the master can stop 21 and also for the motive means 13 is illustrated. Power leads are shown at 50 and 51. The power lead 50 is connected to one end of each of coils 21a, 41a, 42a and 43a. The coil 21a is the energizing coil for the master can stop 21. The coils 41a, 42a and 43a are the energizing coils for the magnets 41, 42 and 43, respectively. As shown, the coil 41a is in parallel with a condenser 52, the function of which is described hereinafter. A resistor 53 is included in series with the condenser 52 to protect the apparatus against surges on charging of the condenser. As also shown a condenser 54 and a resistor 54a are in parallel with the coil 43a for a similar purpose, and a variable resistor 55 is in series with the coil 43a.

The other power lead 51 is connected to a movable contact 56 which is movable to contact either of two fixed contacts 57a and 57b. The contact 57a is connected by a wire 58 to the coil 41a.

The movable contact member 56 is actuated by a relay 60, which is one of three relays in the circuit, the others being indicated by the reference numerals 61 and 62. The other stationary contact 57b is connected by a wire 64 to the coil 42a. The relay 60 also serves to operate a movable contact 65 which is connected by a wire 66 to the power lead 51. The movable contact 65 is capable of making contact with a fixed contact 67 which is connected by a wire 68 to the coil 43a.

Also illustrated is a power lead 76 in the circuit of the motive means 13 (see FIGURE 1) and which is connected by a wire 77 to movable contact members 78a and 78b. The movable contacts 78a and 78b are operated by the relays 61 and 62, respectively, and they are associated with fixed contacts 80a and 80b both of which are connected to a wire 81 which is included in the circuit of the above-mentioned motive means 13.

In operation, and as long as the relay 60 holds the contact members 56 and 57a in contact, it will be seen that the coil 41a will remain energized and the coil 42a will remain de-energized. The operating connection between the relay 60 and the movable contact member 65 is such that the latter (i.e., the movable contact member 65) is not in contact with the fixed contact member 67 under the conditions assumed. Therefore it follows that, under these conditions, the coil 43a also remains de-energized. Referring to FIGURE 2, the condition assumed above corresponds to energization of the magnet 41 and the de-energization of the magnets 42 and 43. Therefore, under these conditions it will be apparent that cans 35 will proceed from the conveyor 12 to the conveyor 15.

Assume now that a surplus of cans has been delivered to the circulating conveyor 18; that the can stop 26 has stopped further flow of cans from the conveyor 15 to the circulating conveyor 18; and that the can stop 26 has caused cans to back up past the sensing head 25a. The circuit associated with the sensing head 25a will operate both the relays 60 and 61. (The function of the relay 61 will be described hereinafter.) Operation of the relay 60 under these conditions will move the movable contact members 56 and 65 into contact with the fixed contact members 57b and 67, respectively. Under these conditions it will be apparent that the coil 41a is de-energized and the coils 42a and 43a are energized. However, it will be noted that the condenser 52 must discharge through the coil 41a thereby delaying the de-energization of coil 41a. The purpose of this delay is as follows: Referring to FIGURE 2, if magnet 41 were de-energized instantly, a can or two or three below the magnet 41 would tend to shift to the right-hand, slanting side of the divider. This is undesirable because it might cause a jam. Therefore the magnetic field of the magnet 41 is caused to decay gradually so that cans that have just passed it but which have not yet cleared the divider will drop into the conveyor 12. Thereafter all the cans flow without jamming from the conveyor 12 to the conveyor 17, being diverted from a vertical path by the now energized magnets 42 and 43.

Assume now that the demand of the fillers 20 in system 16 (FIGURE 1) has depleted the supply of cans circulating in conveyor 18 to the point that no cans pass by the sensing head 28. The sensing head 28 senses an absence of cans as well as a stoppage of cans. Under these conditions (a void adjacent sensing head 28) the can stop 27 is re-activated, then the can stop 26 is inactivated and cans commence moving again from conveyor 15 to circular conveyor 18. The movement of cans in conveyor 15 is sensed by sensing head 25a which brings about energization of coil 41a and de-energization of coils 42a and 43a. This causes a switching of can divider 14 to direct cans to the branch conveyor 15.

Thus conveyor 18 is the demand conveyor and brings about diversion of cans to conveyor 17 or resumption of can supply to conveyor 15, according to the demands of the conveyor 18 and its fillers.

The coil 21a, as will be seen, will be energized only if both movable contacts 70 and 74 are in contact with their stationary contacts 71 and 73, respectively. The circuitry is such that while cans are moving through either the conveyor 15 or the conveyor 17, one pair or the other of the contacts 70, 71 and 73, 74 will be open. Therefore the can stop energizing coil 21a will remain de-energized. In its de-energized state the coil 21a inactivates the can stop 21 and permits the progress of cans to the divider 14. However, the circuitry is such that if sensing heads 25a and 25b both simultaneously sense the presence of stationary cans in their respective conveyors 15 and 17, then both relays 61 and 62 will operate to close both sets of contacts 70, 71 and 73, 74. Under these conditions the coil 21a will be energized and will activate the can stop 21 to interrupt the supply of cans to the can divider 14.

Obviously under these conditions it is also desirable that the motive means 13 be de-energized so that it will not continue to feed cans to the divider 14. This is accomplished in the following manner: It will be apparent that, when the relay 61 is energized movable contact 78a will not be in contact with its stationary contact 80a but unless the relay 62 is also energized, the movable contact 78b will be in contact with its stationary contact 80b. Therefore, an electrical connection is maintained between the wires 76 and 81 and the motive means 13 will continue to operate. If, however, both relays 61 and 62 are energized then both pairs of contacts 78a, 80a and 78b and 80b will be open, the power supply to the motive means 13 will be terminated and the can feed will cease.

Referring now to FIGURES 3 and 4, the can divider 14 is there shown in detail. Its frame 36 comprises a top member 100 having a top plate or flange 101 which can be clamped to a can conveyor such as that shown at 12 in FIGURES 1 and 2. The top member 100 is of angle construction and therefore has a vertical flange 102. Welded to the top member 100 are vertical members 103 on one side (the left-hand side as viewed in FIGURE 3). On the opposite side are similar members 104, which, however, are vertical part of the way down but which slant to the right or flare out in relation to the members 103 for most of their length. Welded to the lower ends of the members 103 and 104 is a bottom member 105 similar to the top member 100 but having a horizontal portion 105a and an upwardly slanting portion 105b. The bottom member 105 can be clamped to a pair of diverging can conveyors such as those shown at 15 and 17 in FIGURES 1 and 2.

A vertical mounting plate 106 is provided to which the ends of screws 107 are rotatably attached so that the screws are free to rotate but will carry the plate 106. The screws 107 have wing heads 108 and they are free to move through holes formed in vertical flange portions of the top and bottom members 101 and 105 and they are threaded into nuts 109 which are welded to the said vertical flange members. Lock nuts 110 are provided. It will, therefore, be apparent that the vertical mounting plate 106 can be moved inwardly to the right as viewed in FIGURE 3, or outwardly to the left, by loosening the lock nuts 107 and rotating the winged heads 108 one way or the other. After suitable adjustment has been made the lock nuts 110 will be tightened.

Rods 115 are attached to the mounting plate 106 and at their inner or right-hand ends they are welded to can guide bars 116, there being two such guide bars as shown in FIGURE 4. As will be seen from an inspection of FIGURE 4, the guide bars 116 contact one side of each passing can. It will be apparent that the adjustment means just described serves to adjust the can divider 14 for cans of different diameters.

On the right-hand side of the can divider 14 as viewed in FIGURE 3 (or on the bottom as viewed in FIGURE 4) a plate 117 is provided which is shaped to conform to the right-hand vertical members 104. That is to say, the plate 117 has an upper vertical portion and a slanting lower portion for most of its length. Can guide bars 118 are carried by the plate 117, which is mounted on the frame 36 as by means of bolt and nut assemblies shown at 119.

It will be seen that the magnet 41 is mounted between the plate 106 and the can guide bars 116 and that the magnets 42 and 43 are mounted between the plate 117 and the can guide bars 118. The magnet 42 is adjacent the upper, vertical portion of bars 118 and the magnet 43 is adjacent the lower slanting portion of the bars 18.

On each side of the frame 36 there is provided a side plate 125. As is best shown in FIGURE 4 each side plate 125 is U-shaped. The outer portion is indicated by the reference numeral 126 and the inner portion by the numeral 127. The inner portion 127 is widened and flares out at 127a and is formed with a longitudinal slot 128 for a purpose described hereinafter. A can guide rod 129 is welded to the slanting edge of each side plate 125. Each side plate 125 is mounted by a pair of screws 130. The screws 130 are similar to the screws 108, each has a wing head 130a and each is threaded through a nut 131 welded to the frame 36 and is fixed at its inner end to the respective plate 125. Lock nuts 132 are also provided. It will be apparent that the two side plates 125 serve as contact members and guides for the ends of cans such as that shown at 35, and that they can be adjusted inwardly or outwardly for cans of different length. Such adjustment is accomplished by loosening the lock nuts 132, manipulating the wing heads 130a and then, when suitable adjustment has been made, tightening the lock nuts 132.

By this means it is apparent that a can divider has been provided which will receive cans from a can conveyor such as that shown at 12 in FIGURES 1 and 2, and, depending upon which of the magnets are energized and which are de-energized, will guide cans straight through in a vertical path to the can conveyor 15 or will guide them along a diagonal path to the can conveyor 17. For convenience the common inlet path is designated as A, the vertical continuation of this path as B and the diagonal branch as C.

A triangular guide member is provided at 133 which is mounted between the side plates 125 by means of screws 134 which extend through the slots 128, and nuts 135 threaded to the screws. The triangular can guide 133 can be adjusted up or down and it will be apparent that, when it is so done, the slanting or righthand portion thereof will be moved closer to or farther from the diagonal can guide bars 118. This adjustment has as its purpose to adjust the width of the diagonal path C for cans of different diameter.

The purpose of the variable resistor 55 (FIGURE 5) is as follows: If the field of magnet 43 is too strong it may, when the path A—C is functioning, tend to hold back cans. Therefore, the voltage supplied to the coil 43a is adjusted to avoid this result.

It will, therefore, be apparent that a can dividing apparatus and associated equipment or a system for dividing a can supply in accordance with demands between two or more paths has been provided which is novel and advantageous.

I claim:

1. A can divider comprising a frame having an inlet end and an outlet end, can guide means supported by said frame to form a common passage leading inwardly from the inlet end of the frame and first and second branch passages each connected to the inner end of said common passage and diverging therefrom to the outlet end of the frame; a first, fixed electromagnetic means operable when energized to attract cans and cause their passage through said common passage and said first branch passage, a second, fixed electromagnetic means opposed to said first electromagnetic means and operable when energized to attract cans and cause their passage through said common passage and second branch passage and means for energizing either of said first and second electromagnetic means selectively.

2. A flow control system for cans or the like comprising a flow divider having a common passage with an input end and an output end and first and second branch passages each having an output end and also having an input end connected to the output end of said common passage, and electromagnetic flow control means whereby the flow of cans or the like through said flow divider is shifted from one branch passage to the other in response to demand upon said first branch passage, said electromagnetic flow control means comprising a first, fixed electromagnet operable, when energized, to cause cans to flow only through said first branch passage, a second, fixed electromagnet opposed to said first electromagnet and adjacent the output end of said common passage, a third fixed electromagnet opposed to said first electromagnet and adjacent the input end of said second passage, and operable, when energized, to cause cans to flow only through said second branch passage and time delay means operable to delay de-energization of either magnet sufficiently to avoid jamming.

3. A can flow divider comprising a frame having an inlet end and an outlet end for inflow and outflow, respectively, of cans; a pair of can side wall guides supported by said frame and a pair of can end guides also supported by said frame for contacting opposite side walls and opposite ends of cans, respectively, and for guiding the cans from the inlet end to the outlet end of the frame; at least one of said side wall guides and at least one of said end guides being adjustable to accommodate cans of different diameters and lengths, respectively; one of said side wall guides being linear and the other of said side wall guides having a first linear portion to form, with the linear side guide, a common entry passage and having also a portion diverging from said linear side wall guide, and an intermediate side wall guide located between the diverging portions of said side guides; said can flow divider also comprising a first, electromagnet mounted adjacent said linear side wall guide, a second electromagnet on the opposite side of said passage from said first electromagnet and located adjacent the diverging portion of said other side wall guide and means for energizing either of said electromagnets selectively.

4. The can flow divider defined in claim 3 including means for delaying the de-energization of said electromagnets sufficiently to avoid jamming.

References Cited in the file of this patent
UNITED STATES PATENTS

| | | |
|---|---|---|
| 1,806,879 | Lindgren | May 26, 1931 |
| 2,312,060 | Kimball | Feb. 23, 1943 |
| 2,570,923 | Dodge | Oct. 9, 1951 |
| 2,743,001 | Nordquist | Apr. 24, 1956 |
| 2,752,027 | Gentry | June 26, 1956 |
| 2,838,160 | Rouse | June 10, 1958 |